Dec. 15, 1959   G. M. DAVIDSON   2,917,237
TRIGONOMETRIC CONVERTER UTILIZING THERMAL ELEMENTS
Filed Jan. 11, 1956

INVENTOR.
GARETH M. DAVIDSON
BY
ATTORNEY.

United States Patent Office 2,917,237
Patented Dec. 15, 1959

2,917,237

TRIGONOMETRIC CONVERTER UTILIZING THERMAL ELEMENTS

Gareth M. Davidson, Bronx, N.Y., assignor to American Bosch Arma Corporation, a corporation of New York Application January 11, 1956, Serial No. 558,547

4 Claims. (Cl. 235—179)

The present invention relates to electrical computing circuits and has particular reference to trigonometric converters.

In present day analog computers trigonometric conversion from the rectangular coordinates $x$ and $y$ of a vectorial quantity into its polar coordinates R and $\theta$, is accomplished with the aid of an electromechanical resolver. The resolver itself is a relatively bulky device and with its associated amplifier, damping device and servo motor, the entire system is costly. The present invention is a completely electrical device, without moving parts, small in size, which requires a minimum of auxiliary apparatus and makes a relatively inexpensive device. The system is not as versatile as the electromechanical resolver but it will fulfill the function of the resolver in a number of situations.

In accordance with this invention the heat transfer principles of thermal computers is employed. One of a pair of temperature sensitive resistors is heated by two separate heaters energized respectively by voltages proportional to $x$ and $y$. The other of the pair of temperature sensitive resistors is heated by a single heater energized by the amplified unbalance voltage of a bridge circuit containing the temperature resistors. Since the heating of each temperature sensitive resistor is proportional to the square of the heater current and the amplifier in the bridge output circuit tends to drive the bridge to a balance, the voltage across the single heater is proportional to the square-rot of the sum of $x^2$ and $y^2$, or is proportional to R.

Voltages proportional to sin $\theta$ and cos $\theta$ rather than the angle $\theta$ are found by division of the $y$ or $x$ component by the R value determined in the thermal computer above. Preferably, a signal dividing circuit containing thermal units is employed.

For a more complete understanding of the invention reference may be had to the accompanying diagrams in which.

Figure 1:
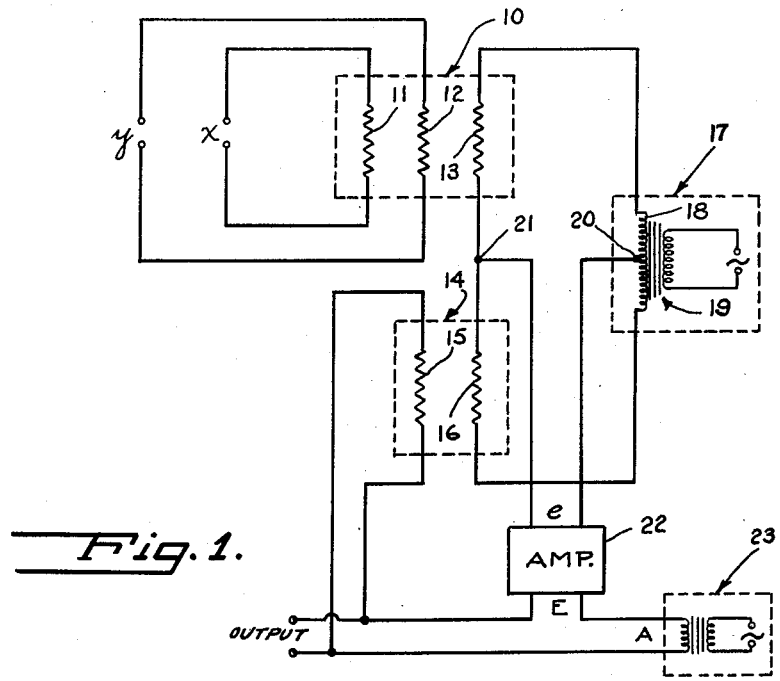
Fig. 1 is a schematic wiring diagram of the present invention.

Referring now to Fig. 1, a thermal element 10 having two heaters 11, 12 and one temperature sensitive resistor 13 in close thermal contact but electrically isolated is shown with the heater 11 being energized according to a signal proportional to one rectangular component $x$ and the heater 12 being energized according to a signal proportional to the other rectangular component $y$ of a vector quantity $R|\theta$, where $$R = \sqrt{x^2 + y^2}$$

and $$\tan \theta = \frac{y}{x}$$

The value of R and the quantities sin $\theta$ and cos $\theta$, rather than the angle $\theta$ itself, are determined with the aid of the circuit in Fig. 1.

A second thermal element 14 contains one heater 15 and one temperature sensitive resistor 16 which is identical to resistor 13. The resistor 16 is connected in series with the temperature sensitive resistor 13 of thermal element 10 across a center tapped constant voltage supply 17 which is shown as the secondary winding 18 of an energized transformer 19 but may be any other similarly operative device. For example, the transformer 19 may be replaced by a pair of equal resistors (not shown) connected across a constant voltage supply. The resistors 13 and 16 and center tapped secondary winding 18 form a bridge circuit whose output, or the voltage between the center tap 20 on winding 18 and the junction 21 of resistors 13 and 16, is applied to the input of a high gain amplifier 22. The output of the amplifier 22 is connected in series with a bias voltage A, supplied from a power supply 23 having the same frequency as the supply 17, across the heating resistor 15 of the thermal element 14.

Since the temperature rise within the thermal element 10 depends on the heating of resistors 11 and 12 by the current in said resistors, and since the heating is proportional to the square of the current through the resistors it will be seen that the temperature rise within thermal element 10 and experienced by resistor 13 is proportional to $x^2 + y^2$.

Similarly, if the voltage across resistor 15 is called Z, the temperature rise in thermal unit 14 to which resistor 16 is exposed is proportional to $Z^2$. When the heating of resistor 16 by resistor 15 is not the same as the heating of resistor 13 by resistors 11 and 12 the consequent difference in resistance of resistors 13 and 16 gives rise to a voltage $e$ between points 20 and 21. The amplifier 22 tends to reduce the voltage $e$ to zero by changing the voltage across resistor 15 until the resistance of resistor 16 matches that of resistor 13. In this condition, the heating current in resistor 15 is proportional to the square root of the heating supplied to thermal unit 10 by the two resistors 11 and 12, or $Z = \sqrt{x^2 + y^2}$. Since mathematically $x^2 + y^2 = R^2$, the voltage Z is proportional to R.

Suppose that in Fig. 1 the resistor 13 is heated according to some particular $x$ and $y$ values. The error signal output will cause the resistor 16 to be heated to reduce the error signal to a value such that the voltage across resistor 15 is just sufficient to maintain the balance condition. At this time the temperature of resistor 16 will be slightly less than that of resistor 13 in order to maintain the balance. If now the energization of resistors 11 or 12 is decreased suddenly, the cooling of resistor 13 may be so rapid that resistor 16 becomes relatively hotter than resistor 13 producing an error signal of reverse polarity. Since the heater 15 is not sensitive to polarity changes of the error signal, the system will attempt to regain a balance by increasing the voltage across resistor 15 instead of decreasing this voltage, leading to instability and possible destruction of the thermal element.

To preclude this possibility, the bias voltage A from power supply 23 and of the same frequency as the voltage supply 17 is used. Thus, the output of amplifier 22 is connected to oppose the bias voltage A when both signals $x$ and $y$ are zero. A balance will be obtained with the voltage E from amplifier 22 substantially equal to A and the voltage across resistor 15, equal to A−E, just sufficient to maintain this balance. If the gain of amplifier 22 is high, the voltage across resistor 15 is small and the error introduced by this device is negligible.

In this condition the temperature of resistor 16 is higher than that of resistor 13. If the value of either $x$ or $y$ increases, the temperature of resistor 13 increases, the value of E decreases, but the total voltage across resistor 15 increases to maintain the temperature of resistor 16 greater than that of resistor 13. If the value of $x$ or $y$ decreases after attaining some greater given value, the error voltage and the voltage E increases (as resistor 13 becomes cooler) but the total voltage across resistor 15 decreases to reduce the temperature of resistor 16. Should $x$ or $y$ increase so rapidly as to reverse the error signal polarity the voltages of E and A would add to create a large signal across resistor 15 and thereby increase the temperature of resistor 16 quickly to that of resistor 13.

Figure 2:
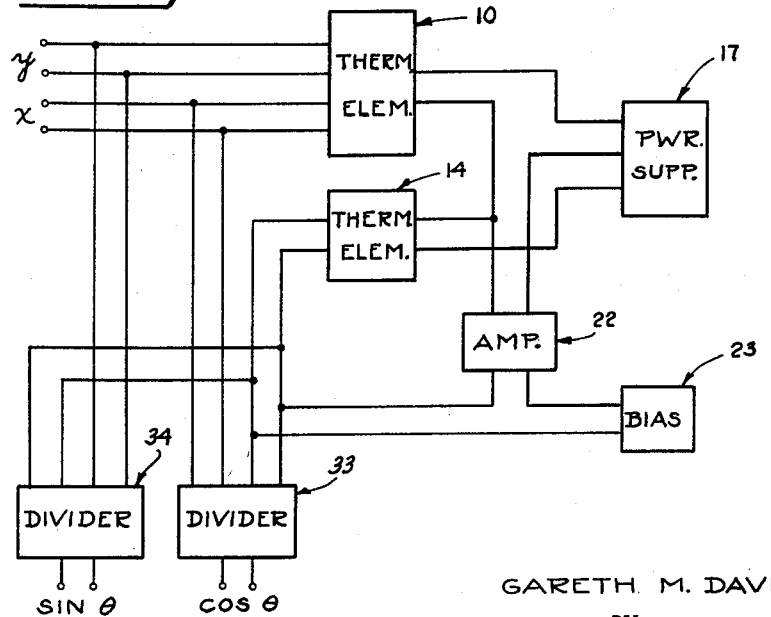
Fig. 2 is a block diagram of a computer using the converter of Fig. 1.

The values of sin $\theta$ and cos $\theta$, which are generally used for transmission of angles to remote locations by electromechanical means, are the ratios of $x/r$ and $y/r$ and are determined in a pair of divider circuits 33 and 34, as per Figure 2. The preferred divider is one of a thermal type such as that described in an article "Subminiature Thermal Computer Element" by G. Davidson, W. Djinis and P. Savet published in Electronic Equipment, June 1955, pp. 16-19. The inputs to divider 33 are the $x$ input signal and the voltage to thermal element 14 which is proportional to $r$. The output of the divider 33 is therefore proportional to $x/r$ or cos $\theta$. Similarly, the inputs to divider 34 are the $y$ input signal and the voltage to element 14 so that the output of divider 34 is proportional to $y/r$ or sin $\theta$.

I claim:

1. In a device of the character described, a pair of input signals, a thermal computer element having a pair of heater members severally energized by said input signals and an sensor member in close thermal proximity, a second thermal computer element having one heater member and one sensor member in close thermal proximity, a constant voltage power supply, a series circuit containing said sensor members and said power supply, connections between said series circuit, from the junction of said sensor members and a point intermediate the ends of said power supply, and the heater member of said second thermal unit whereby the energization of said heater member of said second thermal unit is adjusted to equalize the resistances of said sensor members and output connections across said heater member.

2. In a device of the character described, a pair of input signals, a thermal computer element having a pair of heater members severally energized by said input signals and a sensor member in close thermal proximity, a second thermal computer element having one heater member and one sensor member in close thermal proximity, a constant voltage power supply, a series circuit containing said sensor members and said power supply, said series circuit including a bridge circuit containing said sensors and said power supply, a signal voltage taken from said bridge circuit indicative of the unbalance of the resistances of said sensors and adapted to vary the energization of said heater member of said second thermal unit, whereby the energization of said heater member of said second thermal unit is adjusted to equalize the resistance of said sensor members, and output connections across said heater member.

3. In a device of the character described, a pair of input signals, a thermal computer element having a pair of heater members severally energized by said input signals and a sensor member in close thermal proximity, a second thermal computer element having one heater member and one sensor member in close thermal proximity, a constant voltage power supply, a series circuit containing said sensor members and said power supply, an amplifier having an input and an output, connections between the junction of said sensor members and a point intermediate of the ends of said power supply of said series circuit and the input to said amplifier, a second constant voltage power supply, series connections between the output of said amplifier, said second constant voltage power supply and the heater member of said second thermal unit whereby the resistances of said sensor members are equalized.

4. In a device of the character described, a pair of input signals, a thermal computer element having a pair of heater members severally energized by said input signals and a sensor member in close thermal proximity, a second thermal computer element having one heater member and one sensor member in close thermal proximity, a constant voltage power supply containing an energized transformer with a center tapped secondary transformer winding, electrical connections for connecting said sensor members in series across said transformer winding, an amplifier having an input and an output, electrical connections between said center tap and the junction of said sensors and the input to said amplifier and electrical connections between the output of said amplifier and said heater member of said second thermal unit.

References Cited in the file of this patent

UNITED STATES PATENTS

| | | |
|---|---|---|
| 1,869,128 | Bedford | July 26, 1932 |
| 2,695,967 | Schwartz | Nov. 30, 1954 |

OTHER REFERENCES

Tele-Tech and Electronic Industries (Savet), February 1954; pages 101 and 121.